United States Patent
Shimizu et al.

(10) Patent No.: US 11,014,352 B2
(45) Date of Patent: May 25, 2021

(54) INK-JET RECORDING METHOD AND INK-JET RECORDING APPARATUS

(71) Applicant: CANON KABUSHIKI KAISHA, Tokyo (JP)

(72) Inventors: Yuhei Shimizu, Kawasaki (JP); Masayuki Ikegami, Atsugi (JP); Akira Kuriyama, Atsugi (JP); Yoko Taira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/122,751

(22) Filed: Sep. 5, 2018

(65) Prior Publication Data

US 2019/0077145 A1  Mar. 14, 2019

(30) Foreign Application Priority Data

Sep. 13, 2017 (JP) .............................. JP2017-176184
Jul. 31, 2018 (JP) .............................. JP2018-143284

(51) Int. Cl.
*B41J 2/045* (2006.01)
*B41J 2/05* (2006.01)
*B41J 2/21* (2006.01)
*C09D 11/30* (2014.01)
*C09D 11/322* (2014.01)

(52) U.S. Cl.
CPC ......... *B41J 2/04588* (2013.01); *B41J 2/0458* (2013.01); *B41J 2/04598* (2013.01); *B41J 2/05* (2013.01); *B41J 2/2107* (2013.01); *C09D 11/30* (2013.01); *C09D 11/322* (2013.01)

(58) Field of Classification Search
CPC ...... B41J 2/2107; B41J 2/0458; B41J 2/3556; B41J 2/38; C09D 11/30
See application file for complete search history.

(56) References Cited

U.S. PATENT DOCUMENTS

| 4,723,129 | A  | * | 2/1988 | Endo ..................... B41J 2/0458 346/45 |
| 9,862,187 | B1 | * | 1/2018 | Mu ........................ B41J 2/0454 |
| 2015/0191031 | A1 | * | 7/2015 | Ohta ...................... B41J 2/2114 428/207 |
| 2016/0093525 | A1 | * | 3/2016 | Cook ................... H01L 21/4867 257/676 |
| 2018/0056692 | A1 | * | 3/2018 | Tomura ................ B41M 5/0047 |

FOREIGN PATENT DOCUMENTS

| JP | H0375037 | B2 | 11/1991 |
| JP | 2003292836 | A | 10/2003 |
| JP | 2004-315650 | A | 11/2004 |

* cited by examiner

*Primary Examiner* — Julian D Huffman
(74) *Attorney, Agent, or Firm* — Canon U.S.A., Inc., IP Division

(57) ABSTRACT

A method for ink-jet recording comprising recording an image on a recording medium using an ink-jet recording apparatus including a recording head equipped with a heat generation unit which generates thermal energy for discharging aqueous ink by discharging the aqueous ink from the recording head based on image data by action of the thermal energy, wherein the aqueous ink is discharged once by applying a single pulse waveform voltage to the heat generation unit in the recording, and wherein the aqueous ink includes silver particles.

13 Claims, 3 Drawing Sheets

//INK-JET RECORDING METHOD AND INK-JET RECORDING APPARATUS

BACKGROUND OF THE INVENTION

Field of the Invention

The present disclosure relates to an ink-jet recording method and an ink-jet recording apparatus.

Description of the Related Art

Ink containing metal particles has been used for forming electrical circuits utilizing characteristics of metal particles to be used, however, also used for expressing metallic appearances on Christmas cards and the like in recent years. In such a usage, what is required is not conductivity necessary for electrical circuits but to record an image with a highly decorative metallic appearance (hereinbelow, referred to as "a metallic image"). Ink containing silver particles has been discussed for recording a metallic image (see Japanese Patent Application Laid-Open No. 2003-292836). In addition, an ink-jet recording apparatus has been discussed which includes a recording head equipped with a heat generation unit and a control unit for applying a main heat pulse following a preheat pulse to the heat generation unit for discharging ink once (see Japanese Patent Publication No. 3-75037).

SUMMARY OF THE INVENTION

The present inventors studied to discharge ink described in Japanese Patent Application Laid-Open No. 2003-292836 by applying a pulse waveform voltage twice to a heat generation unit with reference to Japanese Patent Publication No. 3-75037. For example, when ink is repeatedly discharged from a discharge port, it is necessary to more effectively suppress discharge deviation of ink, however, a level of suppressing was not sufficient when the ink described in Japanese Patent Application Laid-Open No. 2003-292836 was used.

Therefore, the present disclosure is directed to the provision of a method for ink-jet recording which can suppress discharge deviation of ink when the ink is discharged by action of thermal energy. The present disclosure is further directed to the provision of an ink-jet recording apparatus which uses the method for ink-jet recording.

The present disclosure relates to a method for ink-jet recording comprising recording an image on a recording medium using an ink-jet recording apparatus including a recording head equipped with a heat generation unit which generates thermal energy for discharging aqueous ink by discharging the aqueous ink from the recording head based on image data by action of the thermal energy, wherein the aqueous ink is discharged once by applying a single pulse waveform voltage to the heat generation unit in the recording, and wherein the aqueous ink includes silver particles.

Further, the present disclosure relates to an ink-jet recording apparatus including a recording head equipped with a heat generation unit which generates thermal energy for discharging aqueous ink and configured to discharge the aqueous ink based on image data by action of the thermal energy, wherein the ink-jet recording apparatus discharges the aqueous ink once by applying a single pulse waveform voltage to the heat generation unit, and wherein the aqueous ink includes silver particles.

According to the present disclosure, a method for ink-jet recording and an ink-jet recording apparatus can be provided which can suppress discharge deviation of ink when the ink is discharged by action of thermal energy.

Further features of the present disclosure will become apparent from the following description of exemplary embodiments with reference to the attached drawings.

BRIEF DESCRIPTION OF THE DRAWINGS

FIG. 3A is a perspective view of a major part of the ink-jet recording apparatus, and FIG. 3B is a perspective view of a recording head

DESCRIPTION OF THE EMBODIMENTS

Figure 1:
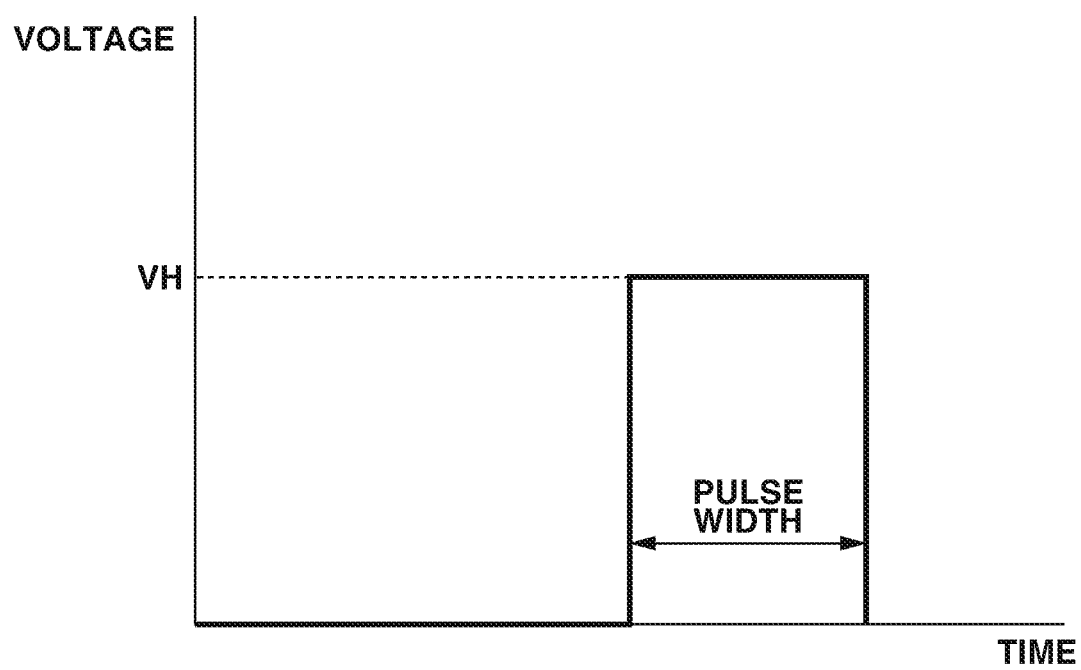
FIG. 1 illustrates pulse control for discharging ink once by applying a single voltage to a heat generation unit.

Exemplary embodiments of the present disclosure will be described in detail below. According to the present disclosure, aqueous ink may be referred to as "ink" below. Unless otherwise specifically noted, various physical property values are values at temperature of 25° C. Descriptions of "(meth)acrylic acid" and "(meth)acrylate" respectively represent "acrylic acid and methacrylic acid" and "acrylate and methacrylate". Applying a single voltage to a heat generation unit means that to apply a voltage only once to the heat generation unit. A preheat pulse is a pulse waveform voltage for warming ink, and a main heat pulse is a voltage for bubbling and discharging the ink. According to the present disclosure, a preheat pulse and a main heat pulse are voltages to be applied based on image data.

As described above, it is found out that discharge deviation of ink occurs when ink containing silver particles is discharged by applying a preheat pulse and a main heat pulse. The present inventors studied a factor of inability to suppress the discharge deviation of ink.

If ink containing silver particles is brought into contact with the heat generation unit when the ink is discharged, the silver particles adhere to the heat generation unit. In addition, when the ink is repeatedly discharged, the silver particles accumulate on the heat generation unit.

Generally, a silver particle has a very high thermal conductivity compared to coloring materials such as carbon black and an organic pigment. Thus, when a thermal energy amount generated from the heat generation unit is the same, the heat generation unit on which silver particles are accumulated easily transfers heat to the ink, and bubbling of the ink existing near the heat generation unit becomes large compared to the heat generation unit on which carbon black and organic pigments are accumulated.

When ink containing coloring materials such as carbon black and organic pigments is repeatedly discharged from a discharge port, discharge deviation of ink does not occur like the case that ink containing silver particles is used even if a preheat pulse and a main heat pulse are applied to the heat generation unit.

However, when ink containing silver particles is repeatedly discharged from a discharge port, thermal energy generated from the heat generation unit is easily transferred to the ink if a preheat pulse and a main heat pulse are applied to the heat generation unit. Thus, bubbling of the ink becomes larger as the ink adheres to a discharge port surface. Accordingly, the ink overflows from the discharge port and adheres to the discharge port surface. When moisture evaporates from the ink remaining on the discharge port surface, silver particles having high surface energy becomes easily adhered thereto. Accordingly, the ink to be discharged next is pulled by the silver particles adhering to the discharge port surface, and discharge deviation of ink occurs. As described above, discharge deviation of ink is a specific issue which occurs when ink containing silver particles is used.

The present inventors thought that it is important to prevent bubbling of ink from becoming too large and to suppress the ink from overflowing from the discharge port in order to suppress discharge deviation of ink. Thus, in order to minimize bubbling of ink, the present inventors set to discharge ink once by omitting a preheat pulse, in other words, by applying a single pulse waveform voltage to the heat generation unit. Since the heat generation unit is applied with only a main heat pulse to discharge ink once, excessive heat is hardly transferred to the ink via silver particles accumulated on the heat generation unit, and bubbling of ink is prevented from expanding to a degree that the ink adheres to the discharge port surface. Accordingly, discharge deviation of ink can be suppressed. Bubbling of ink when ink containing silver particles is discharged once by applying only a main heat pulse is almost as large as bubbling of ink when ink containing coloring materials such as carbon black is discharged once by applying a preheat pulse and a main heat pulse.

<Ink-Jet Recording Method>

Figure 2:
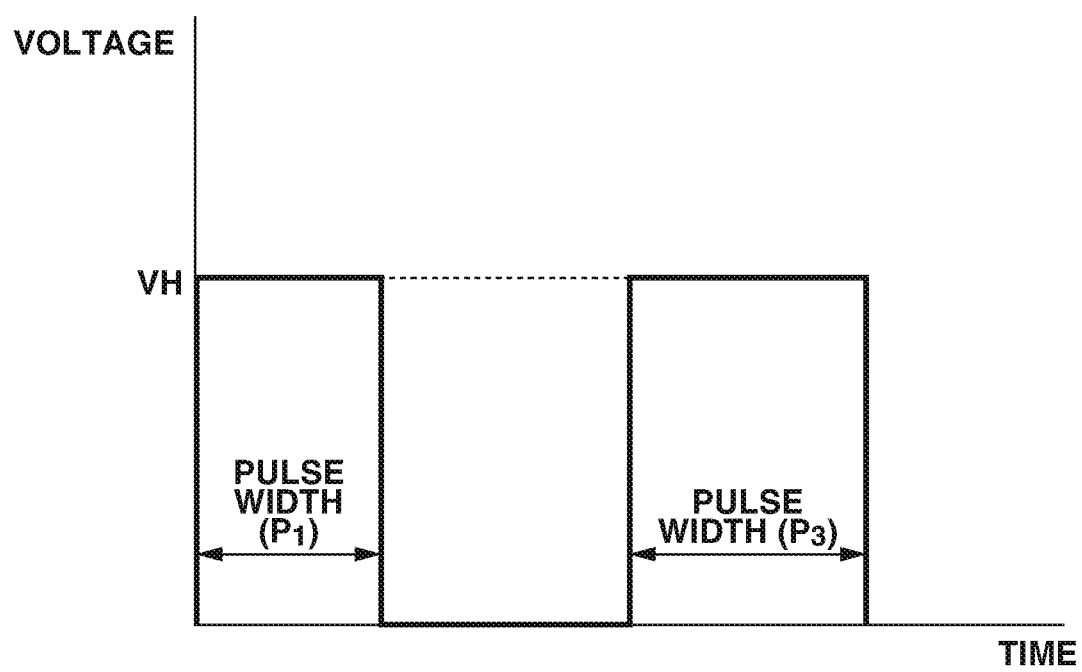
FIG. 2 illustrates pulse control for discharging ink once by applying a voltage twice to a heat generation unit.

An ink-jet recording method according to the present disclosure is for discharging ink from a recording head by action of thermal energy based on image data using an ink-jet recording apparatus including the recording head which is equipped with a heat generation unit for generating thermal energy for discharging the ink. In this regard, a single pulse waveform voltage is applied to the heat generation unit to discharge the ink. As pulse control of the recording head, there are control to apply a single pulse waveform voltage to the heat generation unit for discharging ink once and control to apply a pulse waveform voltage twice to the heat generation unit for discharging ink once. FIG. 1 illustrates pulse control for discharging ink once by applying a single voltage to the heat generation unit. FIG. 2 illustrates pulse control for discharging ink once by applying a voltage twice to the heat generation unit.

In a case without a preheat pulse, a single pulse waveform voltage is applied to the heat generation unit for discharging ink once. As described above, a voltage to be applied based on image data does not include a preheat pulse, namely, a pulse waveform voltage for warming ink. Preheating based on image data is not performed, however, a pulse waveform voltage based on preheating data and a pulse waveform voltage based on preliminary discharging data may be applied other than that. In this regard, a voltage to be applied based on image data is a pulse waveform voltage having an energy amount capable of discharging ink, and a voltage to be applied based on preheating data is a pulse waveform voltage having an energy amount for not discharging ink.

Particularly, when a pulse waveform voltage based on preheating data is applied to the heat generation unit before discharge of ink based on image data, the issue of discharge deviation of ink is more easily caused. When a pulse waveform voltage based on preheating data is applied to the heat generation unit before discharge of ink based on image data, the ink is heated, and viscosity of the ink tends to be reduced. If a volume of an ink droplet is small, ink adhering to a recording medium easily spreads, and an area of the recording medium where the ink can cover becomes larger. However, when ink is heated, heat is easily transferred to silver particles in the ink, bubbling of the ink becomes larger, and thus the issue of discharge deviation of ink is more easily caused. In such a case, discharge deviation of ink can be suppressed by adopting the configuration according to the present disclosure.

An ink discharge frequency is the number of times that the recording head discharges ink per unit time (second), and the higher the ink discharge frequency is, the more easily the ink is heated. Particularly, when an ink discharge frequency is 8 kHz or higher, ink is easily heated, heat is easily transferred to silver particles in the ink, and bubbling of the ink becomes larger, so that the issue of discharge deviation of ink is more easily caused. In such a case, discharge deviation of ink can be suppressed by adopting the configuration according to the present disclosure.

When ink is continuously discharged, the more a cumulative ink discharge amount increases, the more the heat generation unit generates a thermal energy amount, and thus the ink is easily heated. A situation in which a cumulative ink discharge amount tends to increase includes a case when an ink applying amount per unit area in a recording medium is large. Particularly, when an ink applying amount per unit area in a recording medium is 25.0 $g/m^2$ or larger, the ink is easily heated, heat is easily transferred to silver particles in the ink, and bubbling of the ink becomes larger, so that the issue of discharge deviation of ink is more easily caused. In such a case, discharge deviation of ink can be suppressed by adopting the configuration according to the present disclosure.

It is desirable that the ink-jet recording method according to the present disclosure further includes a process for controlling variation in ink discharge amount. The variation in ink discharge amount may be caused by variation in temperature of the recording head, variation in thermal conductivity of the heat generation unit included in the recording head, and the like. For example, when the temperature of the recording head is low, viscosity of ink tends to be higher, so that the ink is hardly discharged, and an ink discharge amount is reduced. On the other hand, when the temperature of the recording head is high, the viscosity of ink tends to be lower, so that the ink is easily discharged, and the ink discharge amount is increased. When a thermal conductivity of the heat generation unit is low, heat is hardly transferred to the ink, so that bubbling of the ink becomes smaller, and the ink discharge amount is reduced. On the other hand, when the thermal conductivity of the heat generation unit is high, heat is easily transferred to the ink, so that bubbling of the ink becomes larger, and the ink discharge amount is increased. When the ink discharge amount varies in response to variation in temperature of the recording head and in thermal conductivity of the heat generation unit, density variation in image cannot be sufficiently suppressed in some cases like density of an image becomes thinner when the ink discharge amount is small, and density of an image becomes thicker when the ink discharge amount is large.

In order to suppress the density variation in image, it is effective to eliminate the variation in ink discharge amount in such a manner that input energy to the heat generation unit is increased when the ink discharge amount is small, and the input energy to the heat generation unit is reduced when the ink discharge amount is large. An input energy amount to the heat generation unit can be adjusted by appropriately changing a pulse width and a voltage, for example, as shown in Table 2 to 4 according to the exemplary embodiment.

As described above, the input energy amount to the heat generation unit can be changed according to variation (a heater rank) in the temperature of the recording head and in the thermal conductivity of the heat generation unit based on a pulse table. In the pulse table, the input energy amount is changed by changing a pulse width while fixing a voltage or changing a voltage while fixing a pulse width. In particular, it is desirable to change the input energy amount by changing a pulse width while fixing a voltage. If a temperature sensor for detecting a temperature is disposed on the recording head, the temperature of the recording head can be detected by the temperature sensor. In the heater rank, a rank Low represents a heater having a high thermal conductivity, and a rank High represents a heater having a low thermal conductivity. A rank Mid represents a heater having a thermal conductivity to ink between those of the rank Low and the rank High.

Figure 3A:
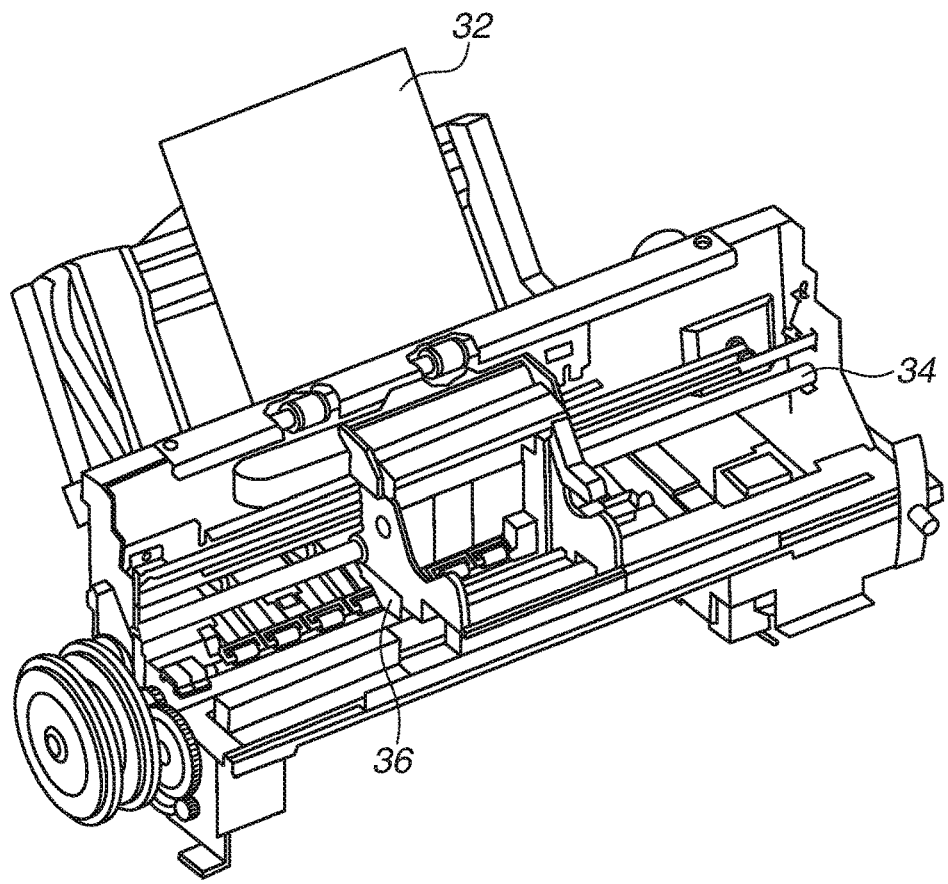
FIGS. 3A and 3B are schematic diagrams illustrating an example of an ink-jet recording apparatus used for an ink-jet recording method according to the present disclosure.
Figure 3B:
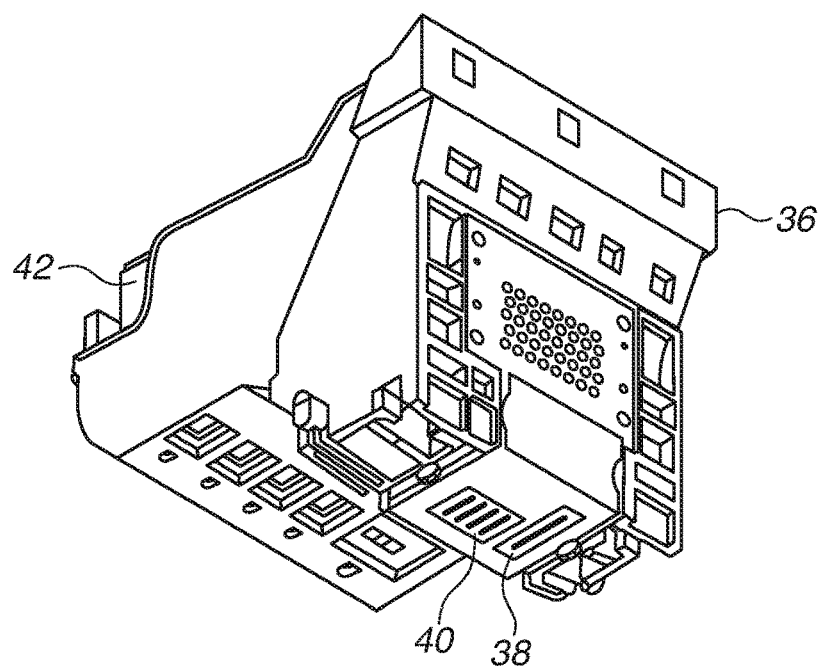

FIGS. 3A and 3B schematically illustrate an example of an ink-jet recording apparatus used in the ink-jet recording method according to the present disclosure. FIG. 3A is a perspective view of a major part in the ink-jet recording apparatus, and FIG. 3B is perspective view of a head cartridge. The ink-jet recording apparatus includes a conveyance unit (not illustrated) for conveying a recording medium 32 and a carriage shaft 34. The carriage shaft 34 can mount a head cartridge 36 thereon. The head cartridge 36 includes recording heads 38 and 40 and is configured to be set the ink cartridge 42 thereto. Ink (not illustrated) is discharged from the recording heads 38 and 40 toward the recording medium 32 while the head cartridge 36 is conveyed in a main scanning direction along the carriage shaft 34. Further, the recording medium 32 is conveyed in a sub-scanning direction by the conveyance unit (not illustrated), and thus an image is recorded on the recording medium 32.

<Aqueous Ink>

Aqueous ink includes silver particles. Components included in the aqueous ink are described below.

(Silver Particle)

Normally, a melting point of silver is 962° C., however, a melting point of a silver particle having a particle diameter from several to tens of nanometers (nm) is known to be lower than the normal melting point of silver. Silver atoms existing on a surface of a silver particle have a weak bond in an inner metallic bond and a high activity. Regarding a silver particle having a particle diameter from several to tens of nanometers, a percentage of silver atoms existing on the surface is high with respect to the total number of silver atoms constituting the particle. In other words, a silver particle having a small particle diameter includes a high percentage of silver atoms having high activity, so that when another silver particle comes close thereto, the silver particle is fusion bonded to the another silver particle and forms a metallic bond between the silver particles.

Generally, when silver particles are used for forming an electrical circuit, ink containing silver particles is applied to a substrate and heated at high temperature from about 200° C. to 300° C., and thus the silver particles are fusion bonded. However, when an image is recorded on a recording medium having permeability, silver particles come close to each other by permeation of a liquid component, so that heating of the recording medium is not necessary. Silver particles are fusion bonded and form a silver layer on the recording medium, and thus image glossiness is obtained.

A silver particle is constituted of silver atoms. A silver particle may be constituted of other metal atoms, oxygen atoms, sulfur atoms, carbon atoms, and the like in addition to silver atoms, however, it is desirable that a percentage (%) of silver atoms in the silver particle is 50.00% by mass or more.

A manufacturing method of silver particles includes, for example, a method for grinding a mass of silver by a grinding mill such as a ball mill and a jet mill (a grinding method) and a method for reducing and aggregating silver ions or silver complexes by a reducing agent (a reduction method). According to the present disclosure, it is desirable to manufacture silver particles by the reduction method from a standpoint of ease of control of particle diameters of silver particles and dispersion stability of silver particles.

[Cumulative 50% Particle Diameter ($D_{50}$) of Silver Particles on Volume Basis]

A cumulative 50% particle diameter of silver particles on a volume basis is a particle diameter at a 50% cumulative value from a small particle diameter side in a cumulative curve of the particle diameter on the basis of a total volume of measured silver particles. The cumulative 50% particle diameter (nm) of silver particles on the volume basis is desirable to be 1 nm or more to 200 nm or less and is more desirable to be 10 nm or more to 100 nm or less from a standpoint of storage stability of ink and image glossiness. $D_{50}$ is measured using a dynamic light scattering method.

[Dispersion Method of Silver Particles]

A dispersion method of silver particles includes a surfactant dispersion type using a surfactant as a dispersant, a resin dispersion type using a resin as a dispersant, and the like. Needless to say, silver particles of which dispersion methods are different can be used together in ink.

A surfactant to be used as a dispersant in the surfactant dispersion type can include an anionic surfactant, a nonionic surfactant, a cationic surfactant, and an amphoteric surfactant. An anionic surfactant includes a fatty acid salt, an alkyl sulfate ester salt, an alkylarylsulfonic acid salt, an alkyldiarylether disulfonic acid salt, a dialkylsulfosuccinic acid salt, an alkylphosphoric acid salt, a naphthalenesulfonic acid formalin condensate, a polyoxyethylene alkyl ether sulfate, a polyoxyethylene alkyl phosphoric acid ester salt, and a glycerol borate fatty acid ester. A nonionic surfactant includes a polyoxyethylene alkyl ether, a polyoxyethylene oxypropylene block copolymer, a sorbitan fatty acid ester, a glycerol fatty acid ester, a polyoxyethylene fatty acid ester, a polyoxyethylene alkylamine, a fluorine-based compound, and a silicone-based compound. A cationic surfactant includes an alkylamine salt, a quaternary ammonium salt, an alkylpyridinium salt, and an alkylimidazolium salt. An amphoteric surfactant includes an alkylamine oxide and a phosphatidylcholine.

It is desirable that a resin used as a dispersant (a resin dispersant) in the resin dispersion type has both of a hydrophilic portion and a hydrophobic portion. A resin includes a polyvinyl resin, a polyester resin, an amino resin, an acrylic resin, an epoxy resin, a polyurethane resin, a polyether resin, a polyamide resin, an unsaturated polyester resin, a phenolic resin, a silicon resin, and a fluorine type polymeric compound.

A weight average molecular weight (Mw) in terms of polystyrene obtained by a gel permeation chromatography (GPC) of resin is desirable to be 1,000 or more to 100,000 or less and is more desirable to be 3,000 or more to 50,000 or less.

In particular, if silver particles adhere to the heat generation unit when ink is discharged from the recording head by the action of thermal energy, a burnt deposit may be easily generated by heat. It is desirable to use a resin rather than a surfactant as a dispersant to suppress generation of a burnt deposit.

Ink includes a dispersant for dispersing silver particles, and a content (mass %) of the dispersant with respect to a content (mass %) of the silver particles is desirable to be 0.05 times or more to 1.00 times or less in a mass ratio (times). When the relevant mass ratio is less than 0.05 times, the content of the dispersant is small with respect to that of the silver particles, and thus the silver particles adhering to the heat generation unit of the recording head is increased, so that heat is more easily transferred to the ink. Accordingly, bubbling of the ink becomes larger, the ink easily adheres to a discharge port surface, and discharge deviation of ink cannot be sufficiently suppressed in some cases. When the relevant mass ratio exceeds 1.00 times, the content of the dispersant is too large with respect to that of the silver particles, and thus it becomes difficult for the silver particles to come close to each other, and the silver particles are hardly fusion bonded to each other. Accordingly, image glossiness cannot be sufficiently obtained in some cases. The relevant mass ration is desirable to be 0.05 times or more to 0.80 times or less. The recording head includes a plurality of heat generation units of which thermal conductivities are different in manufacturing. When the relevant mass ratio exceeds 0.80 times, the content of the dispersant is large with respect to that of the silver particles, the dispersant burnt by the action of thermal energy may adhere to the heat generation unit, and bubbling of the ink becomes easily smaller. When the relevant mass ratio exceeds 0.80 times, and in addition, the recording head of which an ink discharge amount is not controlled is used, an ink discharge amount is reduced because bubbling of the ink becomes smaller, and heat is hardly transferred to the ink from the heat generation unit of which thermal conductivity to the ink is small. Accordingly, density variation in image cannot be sufficiently suppressed in some cases.

The content (mass %) of the silver particles is 2.00 mass % or more to 15.00 mass % or less based on the total mass of the ink. When the silver particle content is less than 2.00 mass %, the silver particles are too few to form a silver film on a recording medium, and image glossiness cannot be obtained in some cases. When the silver particle content exceeds 15.00 mass %, the silver particles are too many, and the silver particles adhering to the heat generation unit included in the recording head are increased, so that heat is more easily transferred to the ink. Accordingly, bubbling of the ink becomes larger, the ink adheres to the discharge port surface, and discharge deviation of ink cannot be sufficiently suppressed in some cases. It is more desirable that the content (mass %) of the silver particles is 6.00 mass % or more to 12.00 mass % or less based on the total mass of the ink.

(Aqueous Medium)

Ink contains an aqueous medium which is water or a mixed solvent of water and a water-soluble organic solvent. It is desirable to use deionized water (ion-exchanged water) as water. A water-soluble organic solvent is not especially limited, and any solvent can be used which can be used as ink for ink-jet such as alcohols, glycols, glycol ethers, and nitrogen-containing compounds. One or more than two types of these water-soluble organic solvents can be included in the ink. A content (mass %) of water in the ink is desirable to be 50.00 mass % or more to 95.00 mass % or less based on the total mass of the ink. In addition, a content (mass %) of the water-soluble organic solvent in the ink is desirable to be 3.00 mass % or more to 50.00 mass % or less based on the total mass of the ink. When the content of the water-soluble organic solvent is less than 3.00 mass %, reliability such as sticking resistance cannot be sufficiently obtained in some cases when the ink is used in an ink-jet recording apparatus. When the content of the water-soluble organic solvent exceeds 50.00 mass %, viscosity of the ink is increased, and a failure in ink supply may be caused.

(Other Components)

Ink may contain urea and a urea derivative, and a water-soluble organic compound which is in a solid state at temperature of 25° C. such as trimethylolpropane and trimethylolethane in addition to the above-described components. Further, the ink may contain various additives such as a pH adjuster, a defoaming agent, a rust-preventing agent, an antiseptic agent, a mildewproof agent, an antioxidant, a reduction inhibitor, and a chelating agent as needed.

(Physical Property of Ink)

Viscosity (mPa·s) of the ink at the temperature of 25° C. is desirable to be 1 mPa·s or more to 5 mPa·s or less and is more desirable to be 2 mPa's or more to 4 mPa·s or less. Further, static surface tension (mN/m) of the ink at the temperature of 25° C. is desirable to be 10 mN/m or more to 60 mN/m or less, is more desirable to be 20 mN/m or more to 60 mN/m or less, and is further more desirable to be 30 mN/m or more to 40 mN/m or less.

The present disclosure is described in more detail below with reference to exemplary embodiments and comparative examples, however, the present invention is not limited to the below-described exemplary embodiments at all as long as it does not depart from the scope of the disclosure. Regarding a component amount, descriptions of "part" and "%" are based on the mass unless otherwise noted.

<Preparation of Silver Particle Dispersion Liquid>

(Silver Particle Dispersion Liquid A)

A liquid containing 0.054 mol/L aqueous sodium hydroxide solution and 1.70 g/L acrylic resin 1 (DISPERBYK-190, manufactured by BYK) was added to 0.054 mol/L aqueous silver nitrate solution and stirred for 10 minutes. The mixture was stirred while being added with 4.60 mol/L aqueous formaldehyde solution, heated to the temperature of 60° C. and maintained for 30 minutes, and then cooled. Subsequently, the mixture was subjected to ultrafiltration using a membrane having a molecular weight cut off of 30,000 dalton, and thus a silver particle dispersion liquid A (a silver particle content of 20.00% and a resin content of 2.00%) was obtained.

(Silver Particle Dispersion Liquid B)

A silver particle dispersion liquid B (a silver particle content of 20.00% and a resin content of 0.80%) was obtained using the method similar to that for preparing the silver particle dispersion liquid A except an amount of the liquid containing the resin 1 was changed to 0.70 g/L.

(Silver Particle Dispersion Liquid C)

A silver particle dispersion liquid C (a silver particle content of 20.00% and a resin content of 1.00%) was obtained using the method similar to that for preparing the silver particle dispersion liquid A except an amount of the liquid containing the resin 1 was changed to 0.80 g/L.

(Silver Particle Dispersion Liquid D)

A silver particle dispersion liquid D (a silver particle content of 20.00% and a resin content of 16.00%) was obtained using the method similar to that for preparing the silver particle dispersion liquid A except an amount of the liquid containing the resin 1 was changed to 13.30 g/L.

(Silver Particle Dispersion Liquid E)

A silver particle dispersion liquid E (a silver particle content of 20.00% and a resin content of 20.00%) was obtained using the method similar to that for preparing the silver particle dispersion liquid A except an amount of the liquid containing the resin 1 was changed to 16.60 g/L.

(Silver Particle Dispersion Liquid F)

A silver particle dispersion liquid F (a silver particle content of 20.00% and a resin content of 22.00%) was obtained using the method similar to that for preparing the silver particle dispersion liquid A except an amount of the liquid containing the resin 1 was changed to 18.30 g/L.

(Silver Particle Dispersion Liquid G)

A silver particle dispersion liquid G (a silver particle content of 20.00% and a resin content of 20.00%) was obtained following a preparation method described in the second exemplary embodiment of Japanese Patent Application Laid-Open No. 2003-292836.

(Silver Particle Dispersion Liquid H)

A silver particle dispersion liquid H (a silver particle content of 5.00% and a resin content of 25.00%) was obtained following a preparation method described in the first exemplary embodiment of Japanese Patent Application Laid-Open No. 2004-315650.

<Preparation of Liquid Containing Silver Particle>

500 mL of an aqueous solution containing 0.25 mol/L iron (II) sulfate heptahydrate (manufactured by Wako Pure Chemical Corporation) and 0.50 mol/L trisodium citrate dihydrate (manufactured by Wako Pure Chemical Corporation) was added with 100 mL of 0.83 mol/L aqueous silver nitrate solution (manufactured by Wako Pure Chemical Corporation) in 3 seconds. The solution was stirred at the temperature of 20° C. for 30 seconds at 300 rpm. The obtained solution was subjected to centrifugal separation at 3,000 rpm, a collected solid content was dispersed in water, and thus a liquid containing silver particles (a silver particle content of 20.00%) was obtained.

<Preparation of Carbon Black Dispersion Liquid>

Carbon black (MA-100, manufactured by Mitsubishi Chemical Corporation), a liquid containing a resin 2, and water were mixed at respective ratios of 20.00%, 50.00%, and 30.00%. The liquid containing the resin 2 is obtained by neutralizing a styrene-acrylic acid copolymer manufactured by an ordinary method with a sodium hydroxide having a molar amount equal to an acid number of the copolymer and contains 20.00% of the resin 2. The mixture was put into a bead mill (LMZ2, manufactured by Ashizawa Finetech Ltd.) filled with 0.3 mm diameter zirconium beads at a filling ratio of 80.00% and dispersed for 5 hours at 1,800 rpm. Subsequently, the mixture was subjected to centrifugal separation at 5,000 rpm for 30 minutes to remove aggregate components and further diluted by ion-exchanged water, so that carbon black dispersion liquid (a carbon black content of 20.00% and a resin 2 content of 10.00%) was obtained.

<Preparation of Ink>

Each component described in Table 1 was mixed and sufficiently stirred, pressure-filtered by a microfilter having a pore size of 3.0 μm (manufactured by FUJIFILM Corporation), and thus ink was prepared. Acetylenol E 100 manufactured by Kawaken Fine Chemicals Co., Ltd. is a nonionic surfactant and an acetylene glycol ethylene oxide adduct.

TABLE 1

Composition and Property of Ink

| | Ink No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Silver Particle Dispersion Liquid A | 50.00 | 9.50 | 10.00 | 75.00 | 75.50 | | | | | | | | | | |
| Silver Particle Dispersion Liquid B | | | | | | | 50.00 | | | | | | | | |
| Silver Particle Dispersion Liquid C | | | | | | | | 50.00 | | | | | | | |
| Silver Particle Dispersion Liquid D | | | | | | | | | 50.00 | | | | | | |
| Silver Particle Dispersion Liquid E | | | | | | | | | | 50.00 | | 50.00 | | | |
| Silver Particle Dispersion Liquid F | | | | | | | | | | | 50.00 | | | | |
| Silver Particle Dispersion Liquid G | | | | | | | | | | | | | 20.00 | | |
| Silver Particle Dispersion Liquid H | | | | | | | | | | | | | | 50.00 | |
| Liquid Containing Silver Particle | | | | | | 50.00 | | | | | | | | | |
| Carbon Black Dispersion Liquid | | | | | | | | | | | | | | | 50.00 |
| Ethylene Glycol | 20.00 | 20.00 | 20.00 | 20.00 | 20.00 | 20.00 | 20.00 | 20.00 | 20.00 | 20.00 | 20.00 | 20.00 | | 20.00 | |
| Glycerin | | | | | | | | | | | | | 10.00 | 16.50 | |
| Methyl Ethyl Ketone | | | | | | | | | | | | | | 1.50 | |
| 2-Pyrrolidone | | | | | | | | | | | | | 10.00 | | |
| Acetylenol E100 | 0.50 | 0.50 | 0.50 | 0.50 | 0.50 | 0.50 | 0.50 | 0.50 | 0.50 | 0.50 | 0.50 | 0.50 | 1.00 | | 0.15 |
| Ion-exchanged water | 29.50 | 70.00 | 69.50 | 4.50 | 4.00 | 29.50 | 29.50 | 29.50 | 29.50 | 29.50 | 29.50 | 29.50 | 59.00 | 32.00 | 29.85 |
| Content of Silver Particle (%) | 10.00 | 1.90 | 2.00 | 15.00 | 15.10 | 10.00 | 10.00 | 10.00 | 10.00 | 10.00 | 10.00 | 10.00 | 4.00 | 15.00 | 10.00 |
| Content of Dispersant/Content of Silver Particle (times) | 0.10 | 0.10 | 0.10 | 0.10 | 0.10 | 0.00 | 0.04 | 0.05 | 0.80 | 1.00 | 1.10 | 1.00 | 1.00 | 5.00 | 0.10 |

<Evaluation>

According to the present disclosure, in evaluation criteria of a below-described evaluation, AA, A, and B represent acceptable levels, and C represents an unacceptable level.

Each ink obtained as described above was filled in an ink cartridge and set to an ink-jet recording apparatus equipped with a recording head for discharging the ink. A type of the used pulse table is described in Table 5.

When the pulse table described in Table 2 is used, the ink was discharged once by applying a single pulse waveform voltage to the heat generation unit. The pulse table described in Table 2 is to discharge the ink so as to make a discharge amount constant by adjusting a pulse width when the recording head includes a plurality of heat generation units of which thermal conductivities to ink are different. A voltage VH was fixed to 24 V.

When the pulse table described in Table 3 is used, the ink was discharged once by applying a single pulse waveform voltage to the heat generation unit. The pulse table described in Table 3 is not to adjust a pulse width different from the prior case when the recording head includes a plurality of heat generation units of which thermal conductivities to ink are different, so that an ink discharge amount is varied. In the pulse table described in Table 3, the voltage VH is fixed to 24 V, and a pulse width is constant in all heater ranks regardless of the temperature of the recording head.

When the pulse table described in Table 4 is used, the ink was discharged once by applying a pulse waveform voltage twice to the heat generation unit. The pulse table described in Table 4 is to discharge the ink so as to make a discharge amount constant by adjusting a pulse width when the recording head includes a plurality of heat generation units of which thermal conductivities to ink are different. The pulse table described in Table 4 is to discharge the ink so as to make a discharge amount constant by fixing the voltage VH to 24 V and changing a pulse width of a first time ($P_1$ in Table 4) and a pulse width of a second time ($P_3$ in Table 4).

In Table 5, an ink discharge method, an ink discharge frequency (kHz), and whether to apply a voltage based on preheating data before discharge of the ink based on image data are further described. In Table 5, Y is described when the voltage based on preheating data is applied to the heat generation unit before discharge of the ink based on image data, and N is described when the voltage based on preheating data is not applied to the heat generation unit. When the voltage based on preheating data is applied to the heat generation unit before discharge of the ink based on image data, the temperature of the recording head was 50 to 59° C. When the voltage based on preheating data is not applied to the heat generation unit before discharge of the ink based on image data, the temperature of the recording head was 20 to 29° C.

When a thermal method is used as an ink discharge method, an ink-jet recording apparatus (PIXUS MG3630, manufactured by Canon Inc.) equipped with a recording head for discharging ink by thermal energy was used. When a piezoelectric method is used as an ink discharge method, an ink-jet recording apparatus (PX-G930, manufactured by Seiko Epson Corporation) equipped with a recording head for discharging ink by mechanical energy was used. When the piezoelectric method is used, the ink was discharged once by applying a single pulse waveform voltage to the heat generation unit. The recording head thereof is to discharge ink so as to make a discharge amount constant by controlling driving of a piezoelectric element.

TABLE 2

Pulse Table

| | | Pulse Width (µs) Temperature of Recording Head | | | | |
| --- | --- | --- | --- | --- | --- | --- |
| | | 20° C.-29° C. | 30° C.-39° C. | 40° C.-49° C. | 50° C.-59° C. | 60° C.-69° C. |
| Heater Rank | Rank Low | 0.95 | 0.90 | 0.85 | 0.80 | 0.75 |
| | . | . | . | . | . | . |
| | Rank Mid | 1.15 | 1.10 | 1.05 | 1.00 | 0.95 |
| | . | . | . | . | . | . |
| | Rank High | 1.35 | 1.30 | 1.25 | 1.20 | 1.15 |

TABLE 3

Pulse Table

| | | Pulse Width (µs) Temperature of Recording Head | | | | |
| --- | --- | --- | --- | --- | --- | --- |
| | | 20° C.-29° C. | 30° C.-39° C. | 40° C.-49° C. | 50° C.-59° C. | 60° C.-69° C. |
| Heater Rank | Rank Low | 1.15 | 1.10 | 1.05 | 1.00 | 0.95 |
| | . | . | . | . | . | . |
| | Rank Mid | 1.15 | 1.10 | 1.05 | 1.00 | 0.95 |
| | . | . | . | . | . | . |
| | Rank High | 1.15 | 1.10 | 1.05 | 1.00 | 0.95 |

TABLE 4

Pulse Table

| | | Pulse Width (μs) Temperature of Recording Head | | | | | | | |
|---|---|---|---|---|---|---|---|---|---|
| | | 20° C.-29° C. | | 30° C.-39° C. | | 40° C.-49° C. | | 50° C.-59° C. | |
| | | P1 (μs) | P3 (μs) | P1 (μs) | P3 (μs) | P1 (μs) | P3 (μs) | P1 (μs) | P3 (μs) |
| Heater Rank | Rank Low | 0.35 | 0.50 | 0.33 | 0.55 | 0.31 | 0.60 | 0.29 | 0.65 |
| | . | . | . | . | . | . | . | . | . |
| | . | . | . | . | . | . | . | . | . |
| | . | . | . | . | . | . | . | . | . |
| | Rank Mid | 0.30 | 0.65 | 0.28 | 0.70 | 0.26 | 0.75 | 0.24 | 0.80 |
| | . | . | . | . | . | . | . | . | . |
| | . | . | . | . | . | . | . | . | . |
| | . | . | . | . | . | . | . | . | . |
| | Rank High | 0.25 | 0.80 | 0.23 | 0.85 | 0.21 | 0.90 | 0.19 | 0.95 |

According to the present exemplary embodiment, it is defined that an image recorded under a condition that 11.2 ng of one ink droplet is applied to a unit area of 1/1200 inches by 1/1200 inches has a recording duty of 100%. Solid images were recorded on Canon Photo Paper, glossy professional (Platinum grade, manufactured by Canon Inc.) using the ink-jet recording apparatus. An ink applying amount (g/m²) per unit area of the recording medium was 25.0 g/m².

(Discharge Deviation of Ink)

Solid images having a recording duty of 100% were recorded, and then discharge deviation was evaluated by visually observing the obtained images.

A: Deviation was not included in the image.
B: Deviation was partly included in the image.
C: Deviation was included throughout the image.

(Density Variation in Image)

Solid images having a recording duty of 50% were recorded, and then density variation in image was evaluated by visually observing the obtained images.

AA: Density variation did not occur in the image.
A: Density variation partly occurred in the image.
B: Density variation occurred throughout the image.

(Image Glossiness)

Solid images having a recording duty of 100% were recorded. The obtained images were naturally dried for 24 hours, and then 20 degree specular glossiness according to JIS Z 8741 was measured using a glossmeter (VG 7000, manufactured by Nippon Denshoku Industries Co., ltd). Results were evaluated according to the following evaluation criteria.

A: The glossiness was 700 or more.
B: The glossiness was 400 or more and less than 700.
C: The glossiness was less than 400.

TABLE 5

Evaluation result

| | Evaluation condition | | | | | Evaluation result | | |
|---|---|---|---|---|---|---|---|---|
| | Ink Type | Pulse Table to be used | Ink Discharge Method | Ink Discharge Frequency (kHz) | Whether to apply voltage based on preheating data before discharge of ink based on image data | Discharge Deviation of Ink | Density Variation in Image | Image Glossiness |
| Exemplary Embodiment 1 | 1 | Table 2 | Thermal method | 6 | Y | A | AA | A |
| Exemplary Embodiment 2 | 1 | Table 3 | Thermal method | 6 | Y | A | A | A |
| Exemplary Embodiment 3 | 2 | Table 2 | Thermal method | 6 | Y | A | AA | B |
| Exemplary Embodiment 4 | 3 | Table 2 | Thermal method | 6 | Y | A | AA | A |
| Exemplary Embodiment 5 | 4 | Table 2 | Thermal method | 6 | Y | A | AA | A |
| Exemplary Embodiment 6 | 5 | Table 2 | Thermal method | 6 | Y | B | AA | A |
| Exemplary Embodiment 7 | 6 | Table 2 | Thermal method | 6 | Y | B | AA | A |
| Exemplary Embodiment 8 | 7 | Table 2 | Thermal method | 6 | Y | B | AA | A |
| Exemplary Embodiment 9 | 8 | Table 2 | Thermal method | 6 | Y | A | AA | A |
| Exemplary Embodiment 10 | 9 | Table 2 | Thermal method | 6 | Y | A | AA | A |
| Exemplary Embodiment 11 | 10 | Table 2 | Thermal method | 6 | Y | A | A | A |
| Exemplary Embodiment 12 | 11 | Table 2 | Thermal method | 6 | Y | A | B | B |

TABLE 5-continued

| | | | | Evaluation condition | | Evaluation result | | |
|---|---|---|---|---|---|---|---|---|
| | Ink Type | Pulse Table to be used | Ink Discharge Method | Ink Discharge Frequency (kHz) | Whether to apply voltage based on preheating data before discharge of ink based on image data | Discharge Deviation of Ink | Density Variation in Image | Image Glossiness |
| Exemplary Embodiment 13 | 12 | Table 3 | Thermal method | 6 | Y | A | B | A |
| Exemplary Embodiment 14 | 1 | Table 2 | Thermal method | 6 | N | A | AA | A |
| Exemplary Embodiment 15 | 1 | Table 2 | Thermal method | 8 | Y | A | AA | A |
| Comparative Example 1 | 1 | Table 4 | Thermal method | 6 | Y | C | AA | A |
| Comparative Example 2 | 1 | Table 4 | Thermal method | 6 | Y | C | AA | A |
| Comparative Example 3 | 13 | Table 4 | Thermal method | 6 | Y | C | AA | A |
| Comparative Example 4 | 14 | Table 4 | Thermal method | 6 | N | C | AA | A |
| Reference Example 1 | 1 | Table 2 | Piezoelectric method | 6 | Y | A | AA | A |
| Reference Example 2 | 1 | Table 4 | Piezoelectric method | 6 | Y | A | AA | A |
| Reference Example 3 | 15 | Table 2 | Thermal method | 6 | Y | A | AA | — |
| Reference Example 4 | 15 | Table 4 | Thermal method | 6 | Y | A | AA | — |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-176184, filed Sep. 13, 2017, and No. 2018-143284, filed Jul. 31, 2018, which are hereby incorporated by reference herein in their entirety.

What is claimed is:

1. A method for ink-jet recording using an ink-jet recording apparatus including a recording head equipped with a heat generation unit which generates thermal energy for discharging aqueous ink, the method comprising:
in a case of discharging a first aqueous ink, discharging the first aqueous ink on a recording medium using the ink jet recording apparatus by applying a single pulse waveform voltage once to the heat generation unit,
wherein the discharging of the first aqueous ink is based on image data, and
wherein the first aqueous ink comprises silver particles;
in a case of discharging a second aqueous ink, discharging the second aqueous ink on a recording medium using the ink jet recording apparatus,
wherein the discharging of the second aqueous ink is based on image data, and
wherein the second aqueous ink comprises a coloring material free of silver particles;
omitting any application of a preheat pulse to the heat generation unit in the case of discharging the first aqueous ink; and
applying a preheat pulse to the heat generating unit in the case of discharging the second aqueous ink.

2. The method according to claim 1, further comprising controlling variation in a discharge amount of the first aqueous ink.

3. The method according to claim 2, wherein the controlling variation in the discharge amount of the first aqueous ink is performed by changing a width of the single pulse waveform voltage while fixing a voltage.

4. The method according to claim 2, wherein the controlling variation in the discharge amount of the first aqueous ink is performed by changing a voltage of the single pulse waveform voltage while fixing a width.

5. The method according to claim 1, wherein a content (mass %) of the silver particles of the first aqueous ink is 2.00 mass % or more to 15.00 mass % or less based on a total mass of the ink.

6. The method according to claim 1, wherein the first aqueous ink comprises a dispersant for dispersing the silver particles, and
wherein a content (mass %) of the dispersant is 0.05 times or more to 1.00 times or less in a mass ratio (times) with respect to a content (mass %) of the silver particles.

7. The method according to claim 6, wherein the dispersant comprises at least one of a surfactant and a resin.

8. The method according to claim 6, wherein the dispersant comprises a resin.

9. The method according to claim 1, wherein a viscosity (mPa·s) of the first aqueous ink at the temperature of 25° C. is 1 mPa·s or more to 5 mPa·s or less.

10. The method according to claim 1, wherein a static surface tension (mN/m) of the first aqueous ink at the temperature of 25° C. is 10 mN/m or more to 60 mN/m or less.

11. The method according to claim 1, further comprising applying a pulse waveform voltage based on preheating data to the heat generation unit.

12. The method according to claim 1, wherein the recording medium is permeable.

13. An ink-jet recording apparatus comprising a recording head equipped with a heat generation unit which generates thermal energy for discharging aqueous ink, wherein in a case of discharging a first aqueous ink, the ink jet recording apparatus is configured to discharge the first aqueous ink on a recording medium using by applying a single pulse waveform voltage once to the heat generation unit, wherein the discharging of the first aqueous ink is based on image data, and wherein the first aqueous ink comprises silver particles, wherein in a case of discharging a second aqueous ink, the ink jet recording apparatus is configured to discharge the second aqueous ink on a recording medium, wherein the discharging of the second aqueous ink is based on image data, and wherein the second aqueous ink comprises a coloring material free of silver particles;

wherein the ink jet recording apparatus is configured to omit any application of a preheat pulse to the heat generation unit in the case of discharging the first aqueous ink; and wherein the ink jet recording apparatus is configured to apply a preheat pulse to the heat generating unit in the case of discharging the second aqueous ink.

* * * * *